United States Patent
Morita et al.

(10) Patent No.: US 7,992,378 B2
(45) Date of Patent: Aug. 9, 2011

(54) EXHAUST GAS PURIFYING DEVICE FOR AN INTERNAL COMBUSTION ENGINE

(75) Inventors: Tomoko Morita, Saitama (JP); Norio Suzuki, Saitama (JP); Naohiro Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 934 days.

(21) Appl. No.: 11/980,924

(22) Filed: Oct. 31, 2007

(65) Prior Publication Data

US 2008/0127640 A1 Jun. 5, 2008

(30) Foreign Application Priority Data

Nov. 24, 2006 (JP) ................................. 2006-317420

(51) Int. Cl.
*F01N 3/00* (2006.01)
*F01N 3/10* (2006.01)
(52) U.S. Cl. ................. 60/286; 60/276; 60/301
(58) Field of Classification Search .................. 60/286
See application file for complete search history.

(56) References Cited

U.S. PATENT DOCUMENTS

| | | | |
|---|---|---|---|
| 5,386,695 A * | 2/1995 | Iwata et al. | 60/276 |
| 5,487,270 A * | 1/1996 | Yamashita et al. | 60/276 |
| 5,636,514 A * | 6/1997 | Seki | 60/277 |

FOREIGN PATENT DOCUMENTS

| | | | |
|---|---|---|---|
| DE | 19918875 A1 | * | 10/1999 |
| JP | 8-303280 | | 11/1996 |
| JP | 2845103 | | 10/1998 |
| JP | 11-311142 | | 11/1999 |
| JP | 2003-74334 | | 3/2003 |
| JP | 2006-207487 A | | 8/2006 |
| WO | 2005/103461 A1 | | 11/2005 |

* cited by examiner

*Primary Examiner* — Thomas E Denion
*Assistant Examiner* — Jason Shanske
(74) *Attorney, Agent, or Firm* — Nelson Mullins Riley & Scarborough LLP; Anthony A. Laurentano

(57) ABSTRACT

An exhaust gas purifying device for an internal combustion engine, comprises: an exhaust purifying catalyst; a NOx purifying catalyst disposed downstream of the exhaust purifying catalyst; upstream and downstream A/F detecting sensors disposed on upstream and downstream sides of the exhaust purifying catalyst, respectively; means for supplying a reducing agent to the NOx purifying catalyst when conducting a reduction control of the NOx; means for calculating an amount of reduced NOx in the NOx purifying catalyst; means for terminating the reduction control when the amount of reduced NOx exceeds a prescribed reduction termination threshold value; means for detecting a degree of deterioration of the exhaust purifying catalyst based on an output from the upstream and downstream A/F detecting sensors; a threshold value correcting means for correcting the reduction termination threshold value according to the degree of deterioration of the exhaust purifying catalyst; and a correction prohibiting means for prohibiting the correction of the reduction termination threshold value when an amount of $H_2$ and/or $CH_4$ in the exhaust gas exceeds a prescribed correction prohibiting judgment value.

12 Claims, 11 Drawing Sheets

EXHAUST GAS PURIFYING DEVICE FOR AN INTERNAL COMBUSTION ENGINE

TECHNICAL FIELD

The present invention relates to an exhaust gas purifying device for an internal combustion engine in that an exhaust purifying catalyst and a NOx purifying catalyst are provided in an exhaust system, and particularly relates to a technique for suppressing increase of harmful exhaust gas components due to erroneous measurement of degree of deterioration of the exhaust purifying catalyst.

BACKGROUND OF THE INVENTION

In lean-burn internal combustion engines (diesel engines, for example), a NOx purification (or removing) catalyst, which is also called as a lean NOx catalyst (LNC), may be fitted in an exhaust passage to clean the exhaust gas by trapping NOx in the exhaust gas during a lean operation, in which an air fuel ratio (referred to as A/F hereinafter) is higher than a stoichiometric A/F, and reducing the trapped NOx during a rich operation, in which the A/F is lower than the stoichiometric A/F or during stoichiometric operation, in which the A/F is equal to the stoichiometric A/F. Because there is a limit to the amount of NOx that the LNC can trap, it is not desirable to continuously conduct the lean operation for an excessive period of time. In order to release NOx trapped by the LNC, the A/F is temporarily made rich, and the released NOx is reduced by reducing agent such as HC and/or CO into $N_2$, which is then discharged to the atmosphere (see Japanese Patent No. 2845103, for example). Such an exhaust gas control is referred to as a reduction rich control hereinafter.

The reduction rich control is conducted intermittently during the lean operation as well as in a transitional period from the lean operation to the stoichiometric operation based on an estimation of an amount of NOx trapped by the LNC (referred to as a trapped NOx amount hereinafter) during the lean operation. Regarding the reduction rich control, Japanese Patent Application Laid-Open Publication (kokai) No. 2006-207487 has disclosed estimating the amount of supply of reducing agent from an output from a linear A/F sensor (LAF sensor) provided upstream of the LNC and a space velocity of the LNC, and terminating the reduction rich control when the estimation exceeds a necessary amount of reducing agent corresponding to the trapped NOx amount.

In recent exhaust purifying devices for diesel engines, an attempt is made to dispose a three way catalyst (TWC) on an upstream side of the LNC in order to further remove harmful exhaust gas components. In the exhaust purifying devices of this type, part of the reducing agent supplied in the reduction rich control is consumed (oxidized) by the TWC and therefore, it is necessary to take this consumption into consideration when setting the amount of reducing agent to be supplied (or the duration time of the reduction rich operation). Further, because the amount of consumption of reducing agent by the TWC can change depending on the degree of deterioration of the TWC, it is necessary to measure the degree of deterioration of TWC to achieve highly precise reduction rich control.

The deterioration of TWC can be measured by additionally providing an LAF sensor (referred to as an F_LAF sensor hereinafter) on an upstream side of the TWC and comparing the output of the F_LAF with that of the LAF sensor provided on a downstream side of the TWC (this LAF sensor can be the same as the above described LAF sensor provided on the upstream side of the LNC and is referred to as an M_LAF sensor hereinafter). However, in diesel engines, the concentration of $H_2$ and/or $CH_4$ in the exhaust gas increases in some operational regions (in a low load and low temperature combustion region, for example), and the detection precision of the LAF sensors can be lowered when the amount of $H_2$ and/or $CH_4$ becomes excessively large.

This is because $H_2$ and $CH_4$ both have a small molecule size and thus are easy to diffuse into a diffusion rate-determining layer of the LAF sensor, and thus when there is a large amount of $H_2$ and/or $CH_4$ in the exhaust gas, the LAF sensor tends to output a detection value of A/F that is richer (approximately 0.5 lower, for example) than an actual A/F. When the F_LAF sensor outputs a detection value that is richer than the actual value, an erroneous judgment is made that the TWC is less deteriorated than it actually is and this can lead to an excessive supply of reducing agent to the LNC, which in turn can result in an increase in an amount of HC or CO discharged to the atmosphere and/or poor fuel consumption efficiency. Conversely, in the case where the M_LAF sensor outputs a detection value that is richer than the actual value, an erroneous judgment is made that the TWC is more deteriorated than it actually is and this can cause a NOx slip to occur and thus increase the amount of NOx discharged to the atmosphere.

BRIEF SUMMARY OF THE INVENTION

The present invention is made to solve such prior art problems, and a primary object of the present invention is to provide an exhaust gas purifying device for an internal combustion engine that is capable of suppressing increase of harmful exhaust gas components due to erroneous measurement of degree of deterioration of the exhaust purifying catalyst provided upstream of the NOx purification catalyst.

To achieve such an object, the present invention provides an exhaust gas purifying device for an internal combustion engine, comprising: an exhaust purifying catalyst provided in an exhaust passage of an internal combustion engine for purifying an exhaust gas; a NOx purifying catalyst disposed downstream of the exhaust purifying catalyst for trapping NOx in the exhaust gas in an oxidizing atmosphere and reducing/purifying the trapped NOx in a reducing atmosphere; an upstream air fuel ratio detecting sensor disposed on an upstream side of the exhaust purifying catalyst to detect an air fuel ratio of the exhaust gas flowing into the exhaust purifying catalyst; a downstream air fuel ratio detecting sensor disposed between the exhaust purifying catalyst and the NOx purifying catalyst to detect an air fuel ratio of the exhaust gas flowing out of the exhaust purifying catalyst; a reducing agent supplying means for supplying a reducing agent to the NOx purifying catalyst to create a reducing atmosphere in the NOx purifying catalyst when conducting a reduction control of the NOx; a reduced NOx amount calculation means for calculating an amount of reduced NOx in the NOx purifying catalyst during the reduction control; a reduction control terminating means for terminating the reduction control when the amount of reduced NOx exceeds a prescribed reduction termination threshold value; a deterioration degree detecting means for detecting a degree of deterioration of the exhaust purifying catalyst based on an output from the upstream air fuel ratio detecting sensor and an output from the down stream air fuel ratio detecting sensor; a threshold value correcting means for correcting the reduction termination threshold value according to the degree of deterioration of the exhaust purifying catalyst detected by the deterioration degree detecting means; and a correction prohibiting means for prohibiting the correction of the reduction termination threshold value by the threshold value correcting means when an amount of $H_2$ and/or CH$_4$ in the exhaust gas of which air fuel ratio is detected by the upstream air fuel ratio detecting sensor and/or the downstream air fuel ratio detecting sensor exceeds a prescribed correction prohibiting judgment value.

Owing to the above structure, the correction of the reduction termination threshold value by the threshold value correcting means according to the degree of deterioration of the exhaust purifying catalyst is prohibited when an amount of H$_2$ and/or CH$_4$ in the exhaust gas exceeds a prescribed correction prohibiting judgment value, it is possible to avoid increase of harmful exhaust gas components in the exhaust gas due to an erroneous evaluation of the degree of deterioration of the exhaust purifying catalyst.

Preferably, the correction prohibiting means determines that the amount of H$_2$ and/or CH$_4$ in the exhaust gas exceeds the prescribed correction prohibiting judgment value when an operational state of the internal combustion engine is in a predetermined operational region. In this way, the structure and process for judging whether or not the amount of H$_2$ and/or CH$_4$ in the exhaust gas exceeds the prescribed correction prohibiting judgment value can be simplified, and this can contribute to reducing the manufacturing cost of the exhaust gas purifying device.

Typically, the predetermined operational region comprises a region where an amount of H$_2$ and/or CH$_4$ generated by the exhaust purifying catalyst exceeds a predetermined value or a region in that a combustion temperature of the internal combustion engine is below a prescribed temperature.

According to another aspect of the present invention, there is provided a method for purifying an exhaust gas of an internal combustion engine comprising an exhaust purifying catalyst provided in an exhaust passage of the internal combustion engine for purifying an exhaust gas and a NOx purifying catalyst disposed downstream of the exhaust purifying catalyst for trapping NOx in the exhaust gas in an oxidizing atmosphere and reducing/purifying the trapped NOx in a reducing atmosphere, wherein the method comprises the steps of: detecting an air fuel ratio of the exhaust gas flowing into the exhaust purifying catalyst; detecting an air fuel ratio of the exhaust gas flowing out of the exhaust purifying catalyst; supplying a reducing agent to the NOx purifying catalyst to create a reducing atmosphere in the NOx purifying catalyst when conducting a reduction control of the NOx; calculating an amount of reduced NOx in the NOx purifying catalyst during the reduction control; terminating the reduction control when the amount of reduced NOx exceeds a prescribed reduction termination threshold value; and correcting the reduction termination threshold value according to the degree of deterioration of the exhaust purifying catalyst, wherein the step of correcting the reduction termination threshold value is prohibited when an amount of H$_2$ and/or CH$_4$ in the exhaust gas flowing into the exhaust purifying catalyst and/or out of the exhaust purifying catalyst exceeds a prescribed correction prohibiting judgment value.

According to a further aspect of the present invention, there is provided a computer-readable medium computer-executable instructions for performing the above method.

BRIEF DESCRIPTION OF THE DRAWINGS

Now the present invention is described in the following with reference to the appended drawings, in which.

DETAILED DESCRIPTION OF THE PREFERRED EMBODIMENTS

In the following, two embodiments of an exhaust gas clearing device for an internal combustion engine according to the present invention are described in detail with reference to the drawings.

First Embodiment

Figure 1:
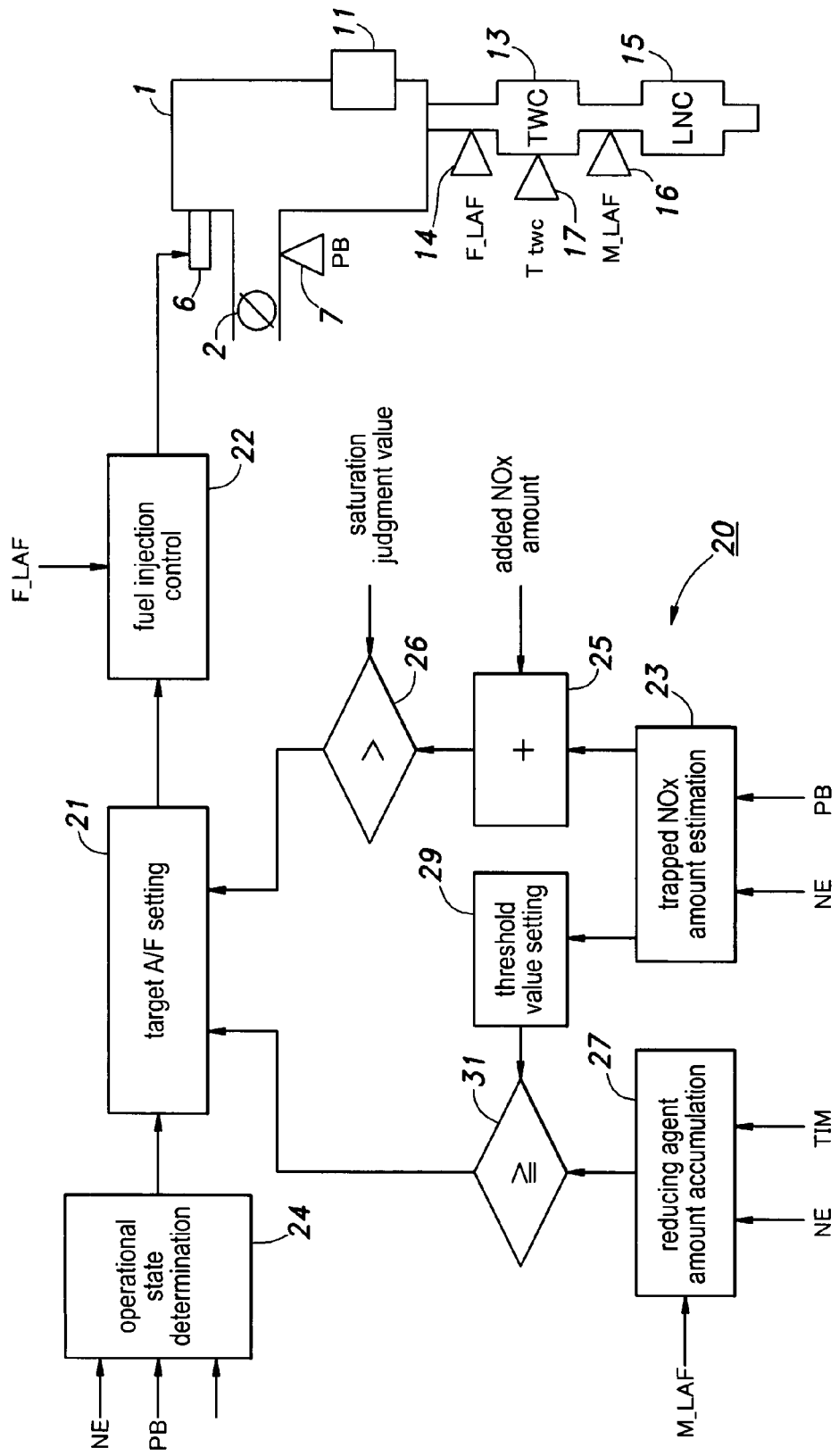
FIG. 1 is an overall structural view of an exhaust gas purifying device according to a first embodiment of the present invention.

First, an explanation is made to the structure of an internal combustion engine to which the present invention is applied. As shown in FIG. 1, the engine 1 comprises an intake passage 2, a fuel injection device 6, a sensor 11 and an exhaust system. The intake passage 2 is equipped with an intake pressure sensor 7 for detecting an intake passage inside pressure (PB), and the intake passage pressure signal from the intake pressure sensor 7 is supplied to an electronic control unit (ECU) 20. The sensor 11 in FIG. 1 comprises an engine speed sensor for detecting an engine rotational speed Ne so that the engine speed sensor (Ne sensor) provides an electric signal indicating the engine rotational speed N3 to the ECU 20. It should be mentioned that the sensor 11 collectively refers to a plurality of sensors inclusive of an engine water temperature sensor, etc.

The exhaust system is equipped with a three way catalyst (TWC) 13 for purifying HC, CO, NOx and serving as an exhaust purifying catalyst. Further, a lean NOx catalyst (LNC) 15 for trapping NOx is provided downstream of the TWC 13 so as to be in series with the TWC 13. The LNC 15 traps NOx in the exhaust gas during a lean operation, and the trapped NOx is reduced by HC, CO contained in the exhaust gas during a rich operation and then released to the atmosphere in the form of N$_2$.

An F_LAF sensor (upstream fuel air ratio detecting sensor) 14 is provided on an upstream side of the TWC 13 (i.e., between the engine 1 and the TWC 13) for detecting the A/F of the exhaust gas between the engine 1 and the TWC 13, and an M_FLA sensor (downstream fuel air ratio detecting sensor) 16 is provided between the TWC 13 and the LNC 15 for detecting the fuel air ratio between the TWC 13 and the LNC 15. Because the TWC 13 has an oxygen storage capacity, the output of M_LAF sensor 16 is delayed with respect to the output from the F_LAF sensor 14. This delay varies depending on the degree of deterioration of the TWC 13. The output signal from the F_LAF sensor 14 is used as a feedback input in a later-described fuel feedback control, and the output signal from the M_LAF sensor 16 is used in a later-described rich spike termination judgment.

The F_LAF sensor 14 and M_LAF sensor 16 outputs signals proportional to the A/F of the exhaust gas, and the output signals from these sensors are forwarded to an ECU 20. The TWC 13 is equipped with a catalyst temperature sensor r17 for detecting the temperature Ttwc of the TWC 13, and the output signal of the catalyst temperature sensor 17 is also forwarded to the ECU 20.

The ECU 20 consists of a computer, and comprises a read only memory (ROM) for storing data and programs executed by the computer, a random access memory (RAM) for retrieving and storing programs and data necessary for program execution and providing a work region for computation, a CPU (processor) for executing programs, a circuit for processing input signals from various sensors, and a drive circuit for supplying control signals to various parts of the engine. FIG. 1 shows such a structure of the ECU 20 by using function blocks.

<General Function of ECU>

A trapped NOx estimation block 23 estimates an amount of trapped NOx of the LNC 15 during the lean operation based on an engine torque Trq and the engine rotational speed Ne from the sensor 11.

In the lean operation, an addition block 25 adds an amount of NOx to be trapped during the reduction rich control to the trapped NOx amount estimated by the trapped NOx estimation block 23. The obtained addition value is compared with a prescribed saturation judgment value at a judgment block 26, and if it is determined that the trapped NOx amount exceeds the saturation judgment value, the judgment signal is output from the judgment block 26 to a target A/F setting block 21. In response to this, the target A/F setting block 21 sets the A/F at a target A/F (KBSRSP) for reduction rich control, which is 13.0, for example. The reason why the addition block 25 adds the amount of NOx that is to be trapped during reduction rich control is because a small amount of NOx is trapped by the LNC 15 during the execution of reduction rich control, and by adding it to the estimation of trapped NOx amount and then judging whether or not to start reduction rich control, it is possible to prevent NOx generated during the reduction rich control from failing to be trapped by the LNC 15 and being discharged to the atmosphere.

An operational state determination block 24 determines an operational state of the vehicle based on various operation parameters such as the engine rotational speed Ne, intake passage pressure PB, accelerator pedal displacement, etc. and accordingly makes selection between the lean operation mode and stoichiometric operation mode to output a operation mode switching signal to the target A/F setting block 21.

The target A/F setting block 21 functions to set a target A/F in accordance with the operational state. For example, when the operational state determination block 24 directs switching from the lean operation to the stoichiometric operation (referred to as lean-to-stoic transition hereinafter), the A/F is temporarily set at a value richer than the stoichiometric A/F to thereby reduce NOx trapped by the LNC 15 during the lean operation and restore the function of the LNC 15. This is referred to as lean-to-stoic transition enrichment. Further, the target A/F setting block 21 sets 13.0 as the target A/F during the lean-to-stoic transition enrichment. In this case, the addition block 25 adds an amount of NOx to be trapped during the lean-to-stoic transition to the estimation of the trapped NOx amount obtained by the trapped NOx estimation block 23. The resulting value is used by a threshold value setting block 29 as a reduction termination threshold value for judging when to terminate enrichment, as described in detail below.

A reducing agent amount accumulation block 27 starts accumulation of an amount of reducing agent when a start of increase of fuel amount is detected during the rich operation (rich spike control). When the accumulation of amount of reducing agent calculated by the reducing agent amount accumulation block 27 reaches the reduction termination threshold value, a reduction termination judging block 31 judges that the reduction has completed (rich spike control has completed) and forwards a reduction termination signal to the target A/F setting block 21.

The threshold value setting block 29 sets a constant value as the reduction termination threshold value during the reduction rich control in the lean operation. During the lean-to-stoic transition enrichment, the threshold value setting block 29 refers to a table not shown in the drawings to retrieve a reduction termination threshold value corresponding to a value obtained by adding the amount of NOx to be trapped during the lean-to-stoic transition enrichment to the estimation of amount of trapped NOx obtained by the trapped NOx estimation block 23.

A fuel injection control block 22 uses the target A/F set by the target A/F setting block 21, and computes a fuel injection pulse width Tout according to the following equation and drives the fuel injection device 6.

$$Tout = TIM \times Kcyl + TiVb,$$

wherein TIM is a basic fuel injection pulse width, Kcyl is an injection compensation term, and TiVb is a null period. TIM and TiVb are set to appropriate values beforehand and the injection compensation term Kcyl is calculated by the following equation:

$$Kcyl = KCMC \times KAF,$$

wherein KCMD is an A/F feedforward compensation term and determined by a reduction rich control target A/F (KBSRSP) and a basic target A/F (KBS) dependent on operational states. KAF is an A/F feedback compensation term, and the ECU 20 conducts the A/F feedback control with the KCMD being a target value.

The fuel injection control block 22 determines injection control parameters such as a number of fuel injections, fuel injection timing, amount of fuel injection and so on based on the calculated fuel injection pulse width Tout, and conducts the fuel injection control based on these injection control parameters to achieve the target A/F. In the fuel injection control during the rich spike control, the fuel injection control block 22 performs the fuel injection control using the output from the F_LAF sensor 14 as the feedback input.

Figure 2:
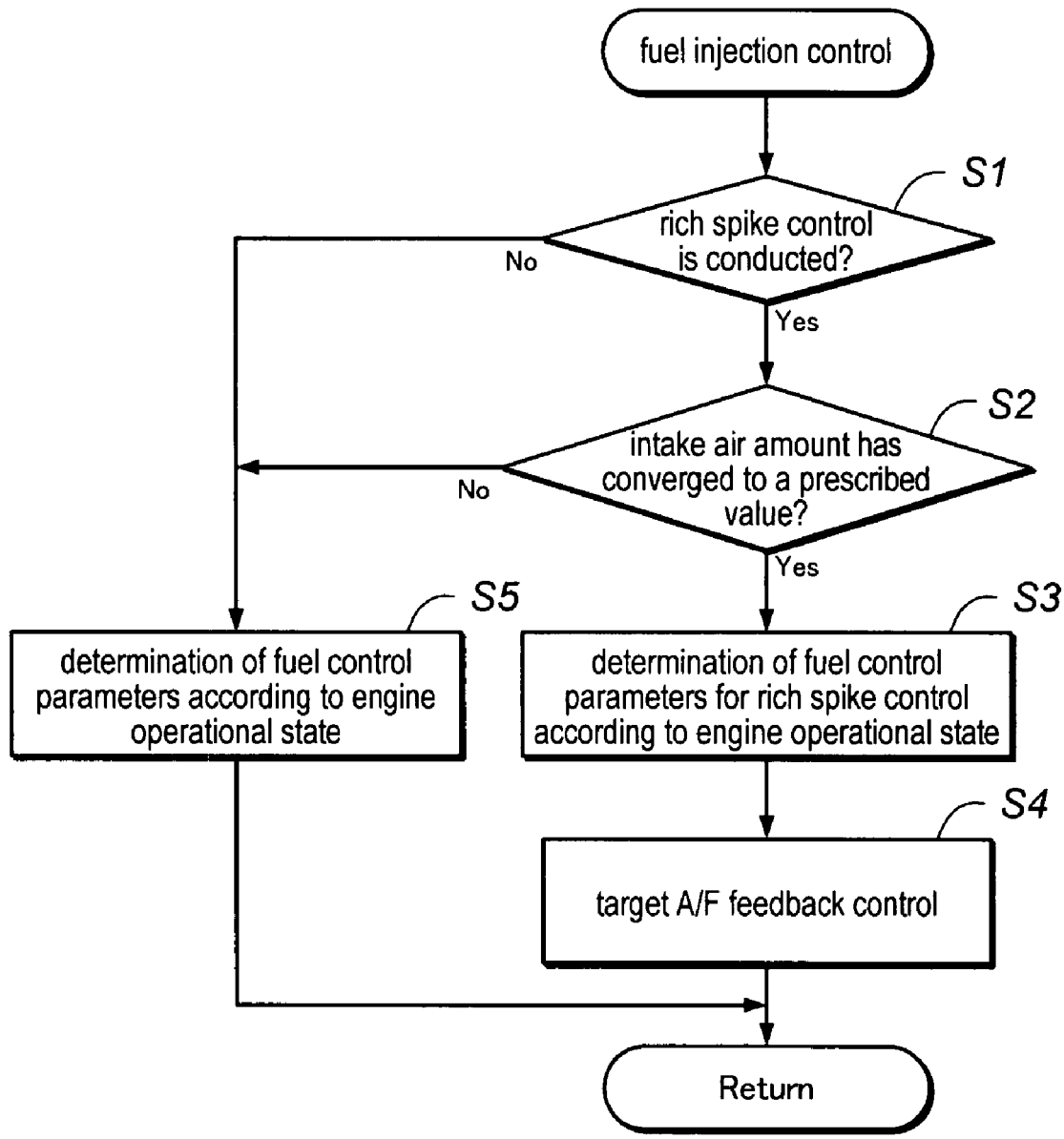
FIG. 2 is a flowchart showing the steps of a fuel injection control feedback process.

Now, with reference to FIG. 2, an explanation is made to the feedback control of the fuel injection control conducted for every top dead center (TDC). First, a judgment is made on whether the rich spike control is being executed or not by referring a predetermined flag or the like (step S1). Such a flag can be a flag that is made into 1 (one) when the lean-to-stoic transition enrichment is conducted or a flag that is made into 1 (one) when a value obtained by adding the estimated amount of NOx trapped by the LNC 15 during the lean operation to the amount of NOx to be trapped during the reduction rich control exceeds a predetermined saturation judgment value (i.e., a flag that is made into 1 (one) when the comparison at the judgment block 26 indicates that the saturation judgment value is exceeded by the addition value). During the rich spike control, the target A/F setting block 21 sets a target A/F suitable for rich condition (13.0, for example).

During the execution of rich spike control, a judgment is made based on the output from the intake pressure sensor 7 on whether an amount of air intake has converged to a prescribed value set beforehand for rich spike control (step S2). This judgment is done by the operational state determination block 24.

When it is found that the amount of air intake has converged to the prescribed value, injection control parameters for the rich spike control are determined according to the engine operational state (step S3). The injection control parameters may include a number of injections, injection timing, amount of injection, etc. In determining these injection control parameters, a map of target torque-Ne (engine rotational speed) may be used. The injection control parameters are determined based on the fuel injection pulse width Tout calculated from the target A/F that in turn is determined in accordance with the engine operational state during the rich spike control.

After the injection control parameters are determined, the fuel injection control block 22 uses the output from the F_LAF sensor 14 as a feedback input to control the feedback control to achieve the target A/F. (step S4).

If the case where the rich spike control is not conducted or where the amount of air intake does not converge, injection control parameters according to an engine operational state when the rich spike control is not conducted (step S5).

In the above feedback control, the A/F control is performed using the output from the F_LAF sensor 14. This is because the output from the M_LAF sensor 16 is not suitable for A/F feedback control for the reason that the A/F downstream of the TWC 13 changes with a delay due to the oxygen storage capacity (OSC) of the TWC 13.

As explained above, a feedback control is performed using the output from the F_LAF sensor 14 provided upstream of the TWC 13 when the rich spike control is conducted, and this can allow the combustion A/F to be substantially maintained to be a prescribed rich A/F with good response, to thereby make it possible to supply reducing agent steadily and suppress combustion fluctuation.

Figure 3:
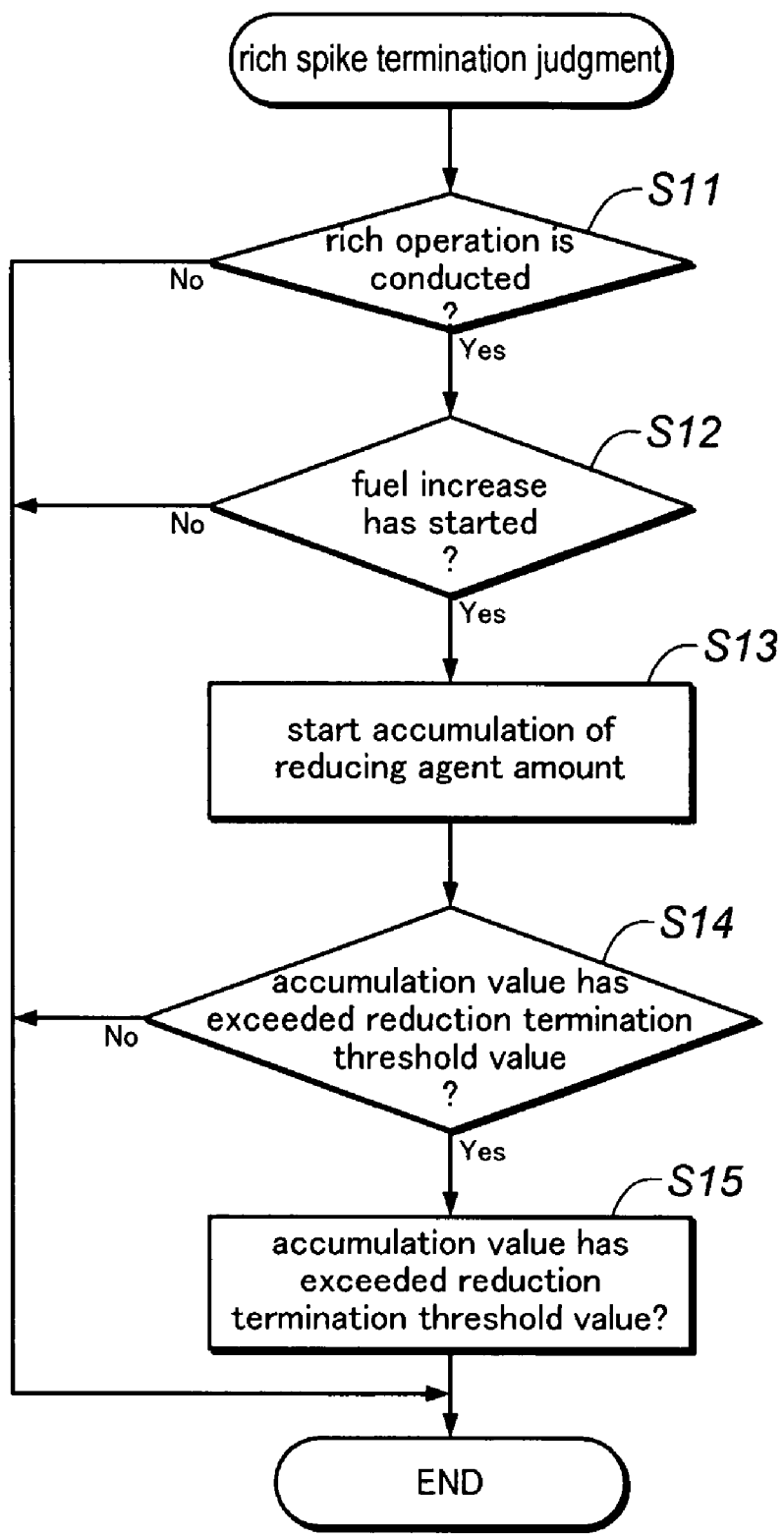
FIG. 3 is a flowchart for showing the steps for determining termination of rich spike control.

Next, an explanation is made to a rich spike control termination judgment process executed for every prescribed cycle such as the TDC, for example. FIG. 3 is a flowchart showing such a rich spike control termination judgment process. First, a judgment is made on whether the rich spike control (or rich operation) is being conducted or not by referring to the above described flag, for example (step S11), and if it is the case, a judgment is made on whether the fuel increase has begun or not (step S12). The start of fuel increase can be detected based on the judgment in step S2 of FIG. 2 on the intake air amount convergence, etc. Upon the start of fuel increase, the reducing agent amount accumulation block 27 of FIG. 1 starts accumulation of amount of reducing agent supplied to the TWC 13 (step S13).

Figure 4:
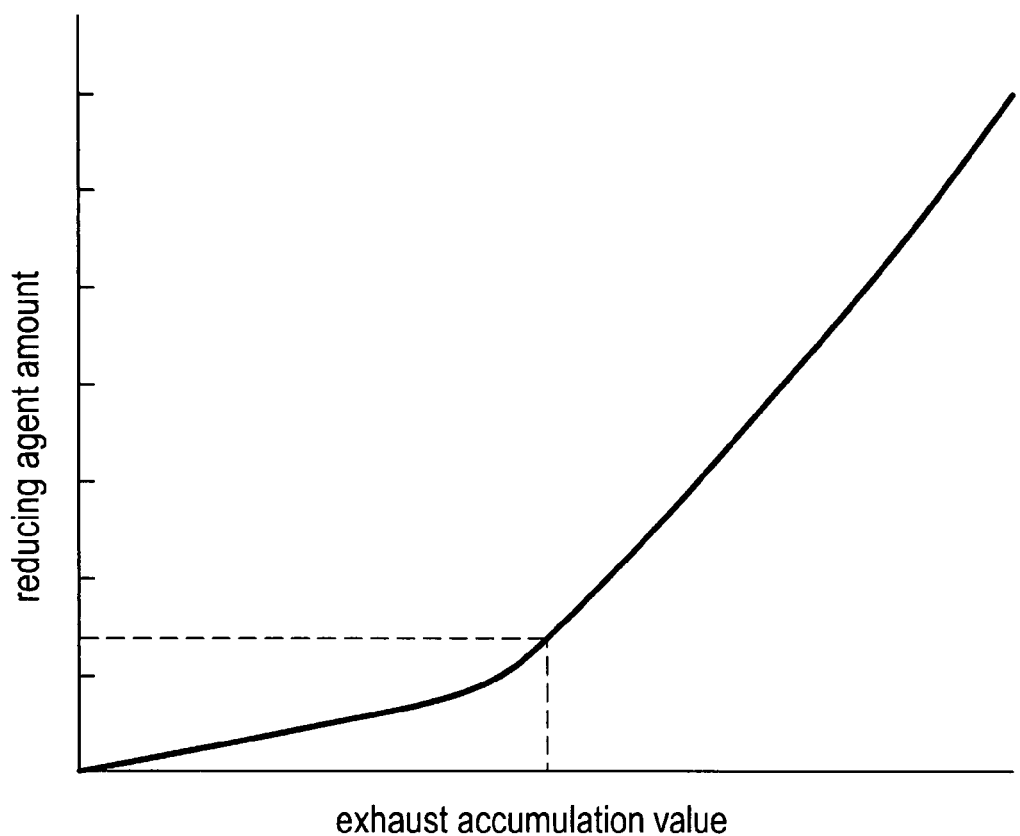
FIG. 4 is a diagram showing a table for estimating an accumulated amount of supply of reducing agent.

The accumulation of reducing agent amount in step S13 is executed once in a prescribed period, for example, 100 msec. The accumulation of reducing agent amount can be achieved by retrieving an amount of reducing agent from the table (graph) shown in FIG. 4 corresponding to an exhaust accumulation value obtained by the following Equation (1):

$$\text{exhaust accumulation value} = \Sigma \{ SV \times (\text{near-stoic } A/F - M\_LAF \text{ output}) \} \quad (1)$$

In Equation (1), SV indicates the space velocity of the exhaust gas in the TWC 13, and near-stoic A/F indicates an A/F in the vicinity of stoichiometric A/F (14.5, for example), and M_LAF output indicates the output from the M_LAF sensor 16. This stoic A/F−actual A/F indicates the richness.

As the space velocity SV, a value correlated to the intake air amount can be used. The value correlated to the intake air amount can be calculated as a value NTI (=NeTI×KPA), which is calculated by first multiplying one sixteenth (1/16) of the basic fuel injection period TIM with the engine rotational speed Ne to obtain NeTI, and then multiplying NeTI with an atmospheric pressure correction term KPA determined from the atmospheric pressure detected by an atmospheric pressure sensor. The calculation of the intake air amount may not be limited to the above, and an actual value (measured value) may be used. The accumulated amount of reducing agent calculated in step S13 represents an amount of NOx reduced in the LNC 15, and thus the reducing agent amount accumulation block 27 of FIG. 1 serves as a reduced NOx amount calculation means.

Subsequently, a judgment is made on whether or not the accumulated amount of reducing agent obtained in step S13 has exceeded a reduction termination threshold value (step S14). The reduction termination threshold value used here can be the value set by the threshold value setting block 29 in FIG. 1. Specifically, the threshold value setting block 29 sets a constant necessary reducing agent amount as the reduction termination threshold value during the lean operation, while during the enrichment in the transition from lean to stoichiometric operation, the threshold value setting block 29 sets, as the reduction termination threshold value, a necessary reducing agent amount retrieved from a table based on a value obtained by adding the trapped NOx amount estimated by the trapped NOx estimation block 23 with the above described amount of NOx to be trapped by the LNC 15 during the enrichment in the lean-to-stoic transition. It should be mentioned that it is possible, during both the reduction rich control in the lean operation and the enrichment in the lean-to-stoic transition, to use a map representing the relationship between the trapped NOx amount and the necessary reducing agent amount (reduction termination threshold value) in order to obtain a necessary reducing agent amount corresponding to the estimation of the trapped NOx amount calculated by the trapped NOx estimation block 23 and use the thus-obtained necessary reducing agent amount as the reduction termination threshold value for judging the termination of rich operation.

When the accumulated amount of reducing agent exceeds the reduction termination threshold value, the reduction termination judging block 31 judges that the rich spike control has completed (step S15). This termination judgment signal is input to the target A/F setting block 21, which accordingly make the target A/F set at the stoichiometric A/F or the A/F in the lean operation, whereby terminating the rich spike control.

As described above, in the above rich spike termination judgment, the output from the M_LAF sensor 16 is used in the accumulation of amount of reducing agent. This is because if the output of the F_LAF sensor 14 were used, the amount of reducing agent actually supplied to the LNC 15 could vary depending on the degree of deterioration of the upstream TWC 13 (i.e., if the TWC 13 is fresh, the amount of reducing agent will be insufficient, and if the TWC 13 has deteriorated, the amount of reducing agent will be excessive), and this could lower the exhaust purifying ability (EM).

Thus, by judging whether to terminate the rich spike control or not using the output from the M_LAF sensor 16, it is possible to desirably control the amount of supply of reducing agent suitable for the A/F at the downstream of the TWC 13, and therefore, an appropriate amount of reducing agent can be supplied to the LNC irrespective of the degree of deterioration of the TWC 13 so that a stable EM ability can be achieved.

Second Embodiment

In a second embodiment, the degree of deterioration of the TWC 13 is detected and according to the detection result, the reduction termination threshold value used for the rich spike termination judgment in step 14 of FIG. 3 is varied.

The output from the M_LAF sensor 16 delays with respect to the output from the F_LAF sensor 14 due to the oxygen storage capacity (OSC) of the TWC 13. This delay becomes shorter as the TWC 13 deteriorates more. The delay of the output from the M_LAF sensor 16 with respect to the output from the F_LAF sensor 14 caused by the deterioration of TWC 13 can vary depending on the amount of adsorption of oxygen by the OSC in the TWC 13 during the time period between the previous conduction of rich spike control to the current conduction of rich spike control, i.e., during the immediately preceding lean operation. For this reason, the above estimation of accumulated amount of reducing agent can differ from the actual amount of reducing agent and the amount of supply of reducing agent can be instable, which can deteriorate the ability of purifying CO, HC, NOx, etc. To solve such a problem, a deterioration correction is performed in the second embodiment, as described below.

Figure 5:
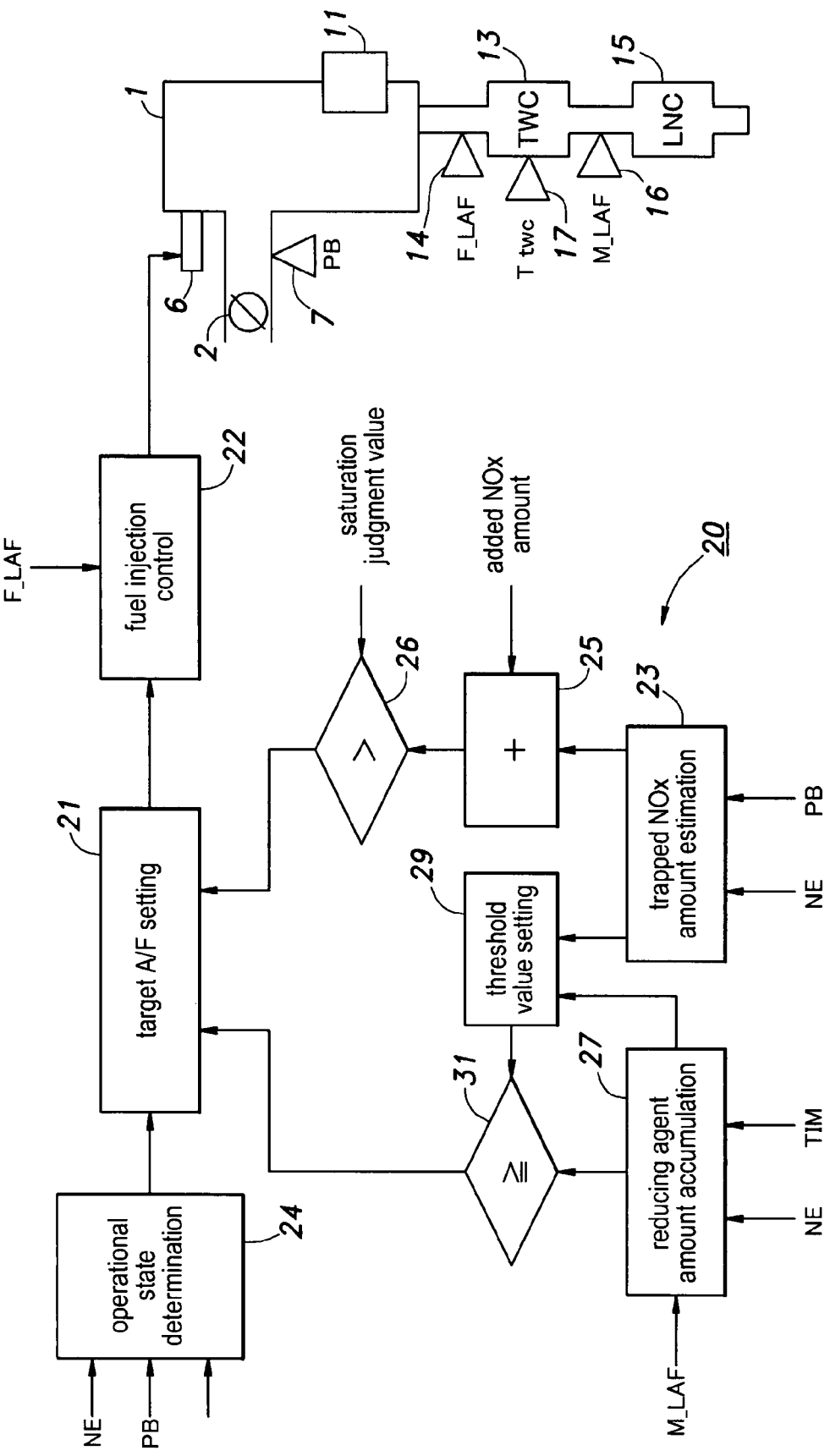
FIG. 5 is an overall structural view of an exhaust gas purifying device according to a second embodiment of the present invention.

FIG. 5 is a diagram showing the structure of an internal combustion engine, exhaust gas purifying device and electronic control unit according to the second embodiment. In the structure of FIG. 5, a structure for providing an output from the reducing agent amount accumulation block 27 to the threshold setting block 29 is added to the structure of FIG. 1. In FIG. 5, the reference numerals identical with those in FIG. 1 designate same component parts unless otherwise mentioned.

In the second embodiment, both of the F_LAF sensor 14 and M_LAF sensor 16 are used in detecting the degree of deterioration of the TWC 13. Specifically, the F_LAF sensor 14 is used as a sensor for calculating the amount of reducing agent supplied to the TWC 13 while the M_LAF sensor 16 is used as a sensor for calculating the amount of reducing agent discharged from the TWC 13.

Besides the operation explained regarding the first embodiment, the reducing agent amount accumulation block 27 starts accumulation of amount of reducing agent based on the output from each of the F_LAF sensor 14 and M_LAF sensor 16 when it is determined that the fuel increase has started during the rich operation (rich spike control). The accumulated amount of reducing agent based on each output is forwarded to the threshold value setting block 29.

Besides the operation explained regarding the first embodiment, the threshold setting block 29 starts detecting the degree of deterioration of the TWC 13 when, after it is determined that the fuel increase has started during the rich operation (rich spike control), the rich spike operation has become stable and the output from the M_LAF sensor has reached a prescribed output. According to the detected deterioration state, the threshold value setting block 29 modifies the initially set reduction termination threshold value. The detection of degree of deterioration of the TWC 13 can be done by using the accumulated amount of reducing agent calculated by the reducing agent amount accumulation block 27 based on the output from each of the F_LAF sensor 14 and M_LAF sensor 16.

Figure 6:
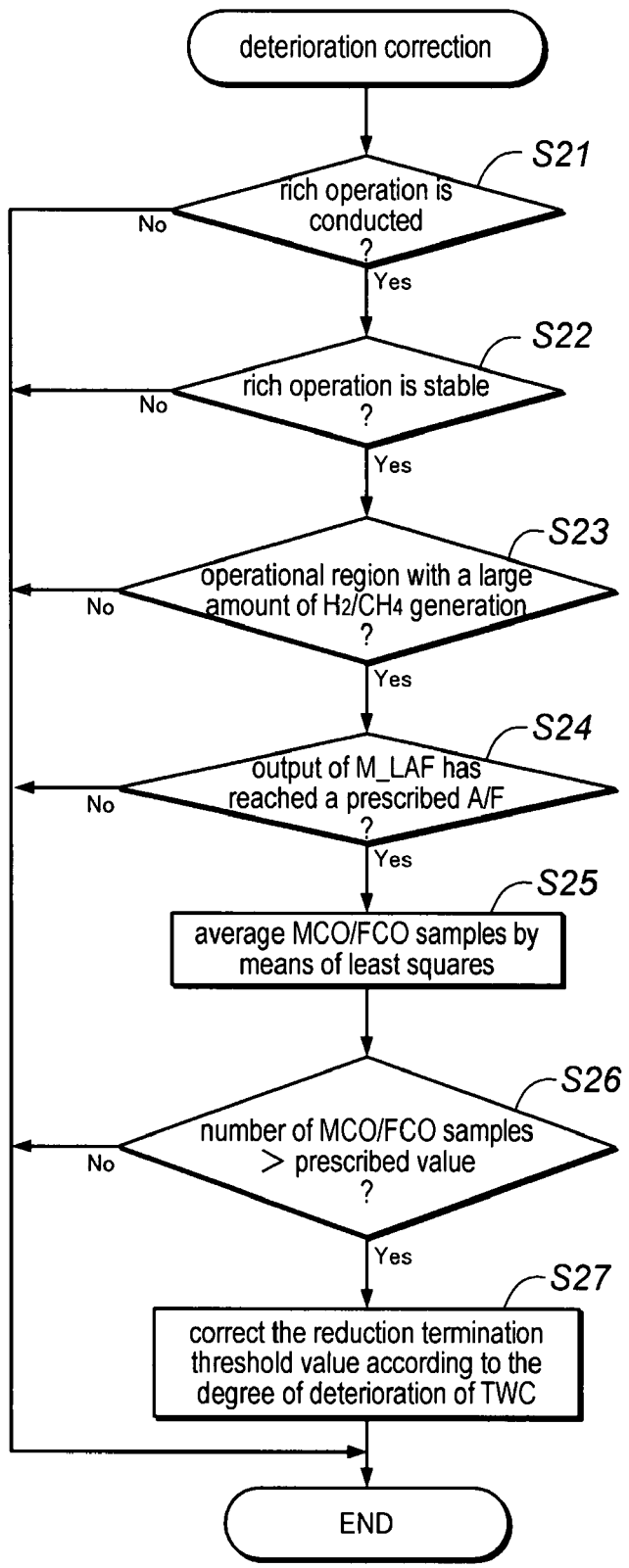
FIG. 6 is a flowchart showing the steps for correcting a reduction termination threshold value.

FIG. 6 is a flowchart showing the process for correcting the reduction termination threshold value used in the rich spike termination judgment according to the degree of deterioration of the TWC 13. In FIG. 6, first, a judgment is made on whether the rich spike control is being conducted or not by referring to the above described flag or the like (step S21), and if the judgment result is "NO", the correction of reduction termination threshold value is not performed.

While conducting the rich spike control, if the judgment result in step S21 is "YES", then a judgment is made on whether the rich spike control is stable or not (step S22), and if the judgment result is "NO", the correction of reduction termination threshold value is not performed. In the judgment in step S22, it is necessary for the rich spike control to be found stable that a shift change is not made during the rich spike control and/or that the engine rotational speed Ne is stable, for example.

If the rich spike control is stable and hence the judgment result in step S22 is "YES", then a judgment is made on whether or not an operational condition is in a region where a large amount of $H_2$ and/or $CH_4$ tends to be produced in the exhaust gas (step S23), and if the judgment result is "YES", the correction of reduction termination threshold value is not performed.

Figure 7:
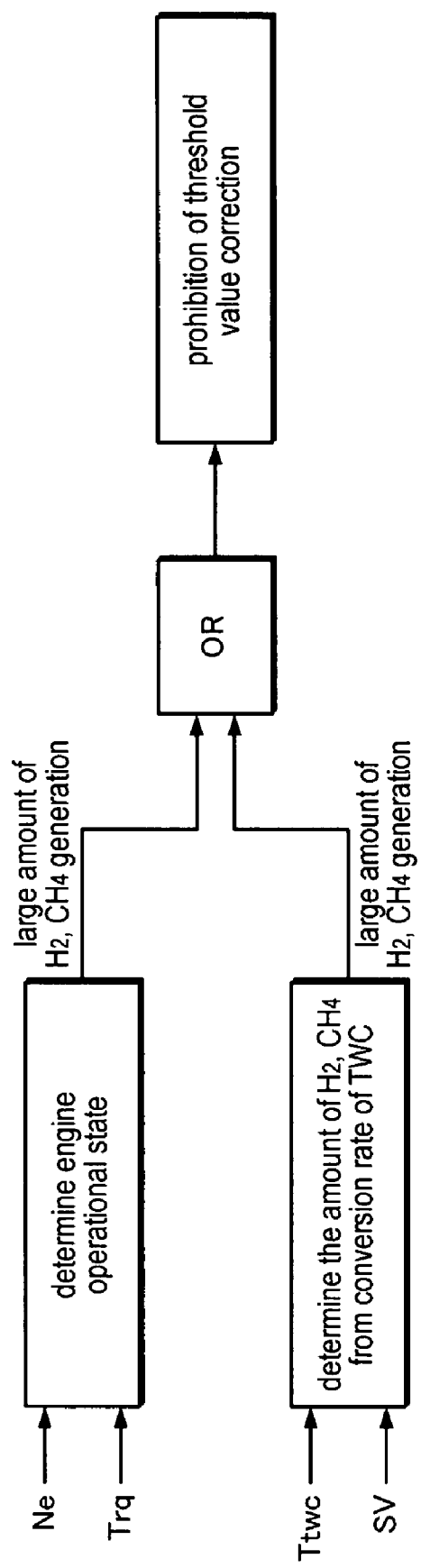
FIG. 7 is a control block diagram showing a control process when a large amount of H$_2$ and/or CH$_4$ is generated.

In this embodiment, the judgment in the step S23 may be specifically made as shown n a control block diagram of FIG. 7. As shown, a current operational region of the engine 1 is determined based on the engine rotational speed Ne and the engine torque Trq while an amount of generation of H2 and CH4 is determined from the current conversion rate of the TWC 13 obtained based on the temperature Ttwc of the TWC 13 and the space velocity SV of the TWC 13, so that if it is found that at least one of $H_2$ and $CH_4$ is generated in a large amount, it is considered that the amount of generation of $H_2$ and/or $CH_4$ will exceed a correction prohibiting threshold value and thus the correction of reduction termination threshold value is not performed.

Figure 8:
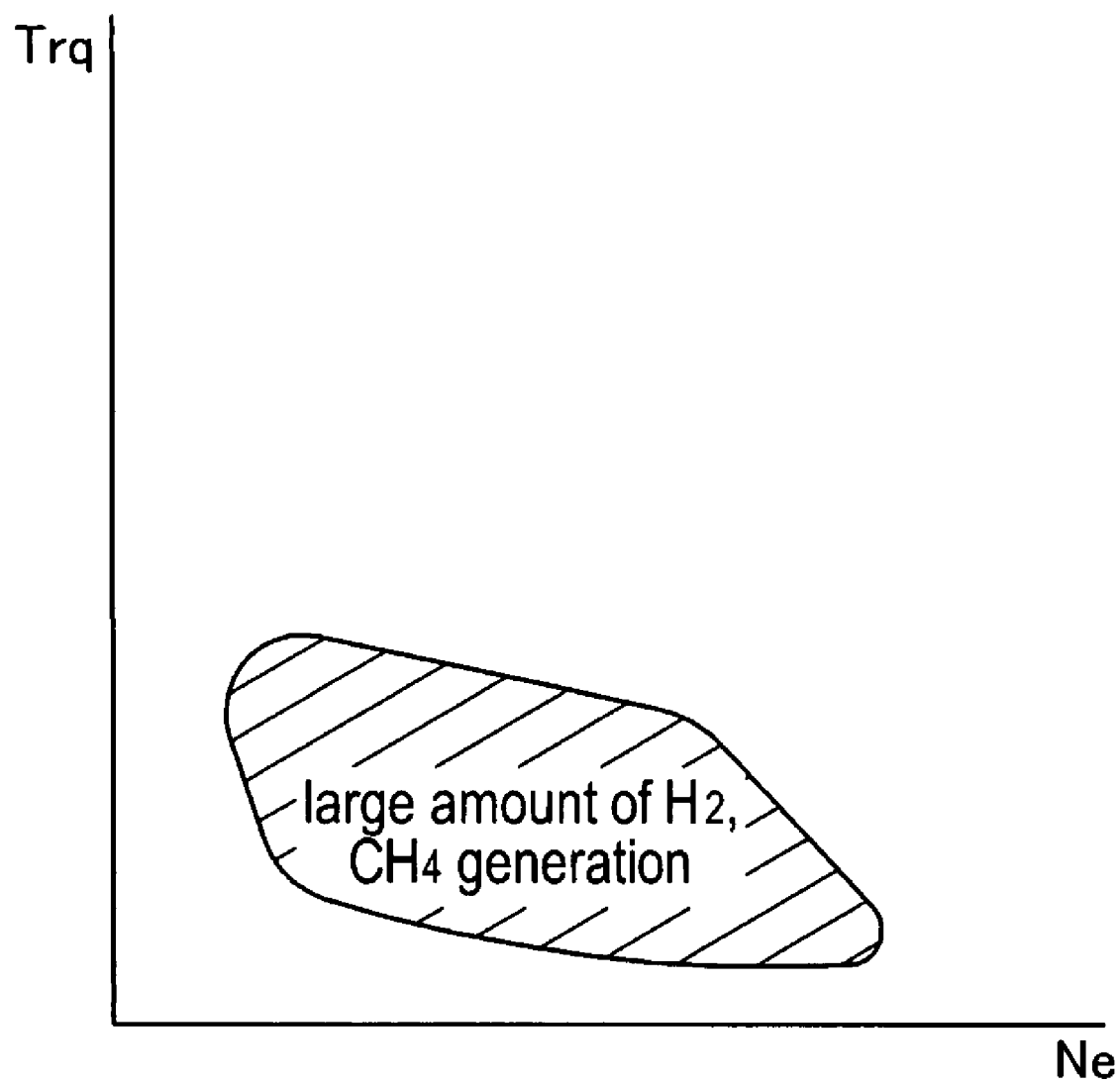
FIG. 8 is a graph showing an engine operational region where a large amount of H$_2$ and/or CH$_4$ tends to be generated.

As shown in FIG. 8, the operational region in which a large amount of H2 and/or CH4 tends to be generated mostly consists of a low load operational region (i.e., a low temperature combustion region). In such an operational region, increase of EGR and/or advancement of injection timing are often conducted to prevent HC that has not been oxidized in the low temperature combustion from forming particulate matter (PM), but because the reaction is slow, the change of HC may not be completed and can result in generation of $H_2$ and/or $CH_4$.

Figure 9:
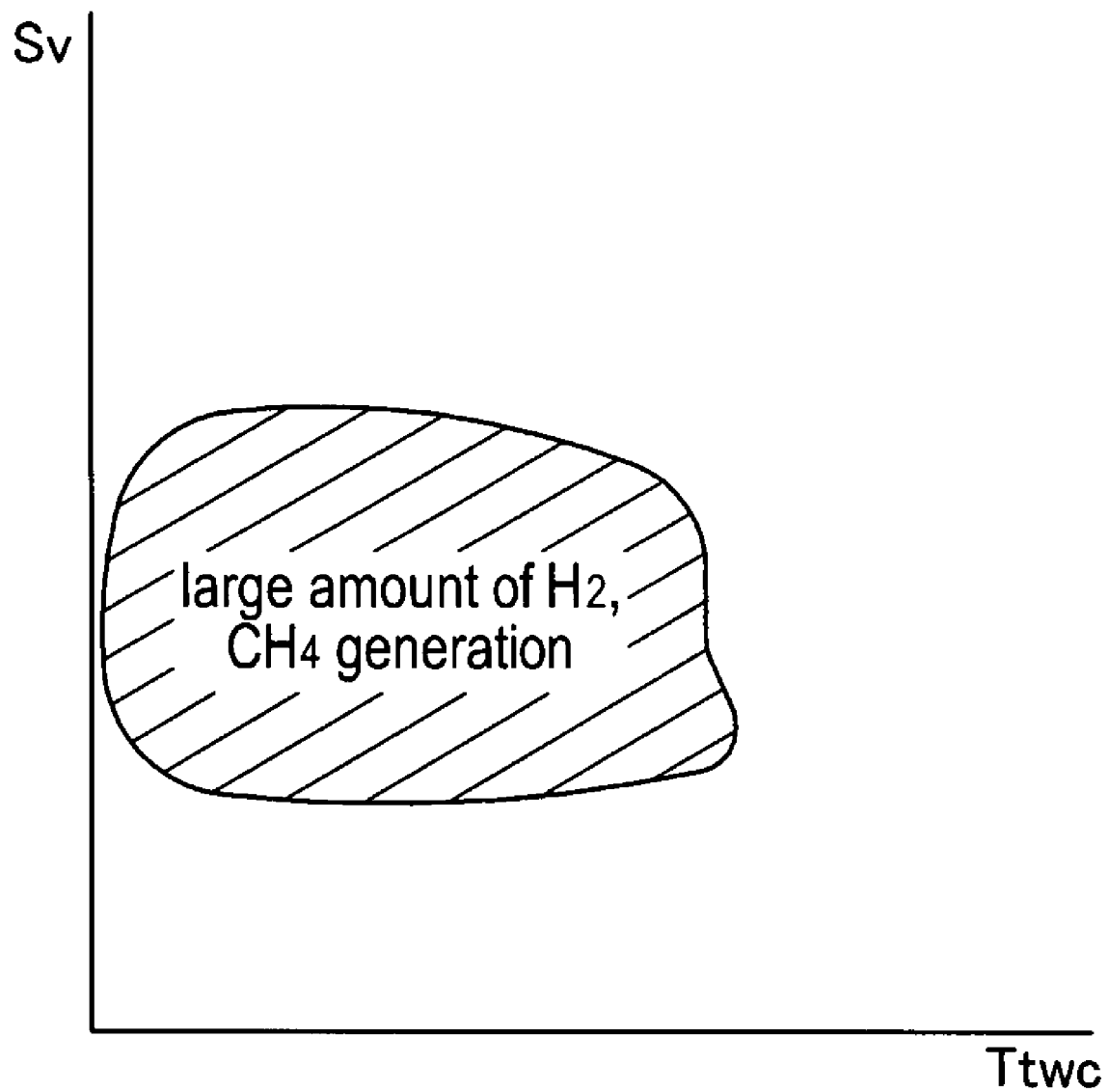
FIG. 9 is a graph showing a conversion ratio of TWC.
Figure 10:
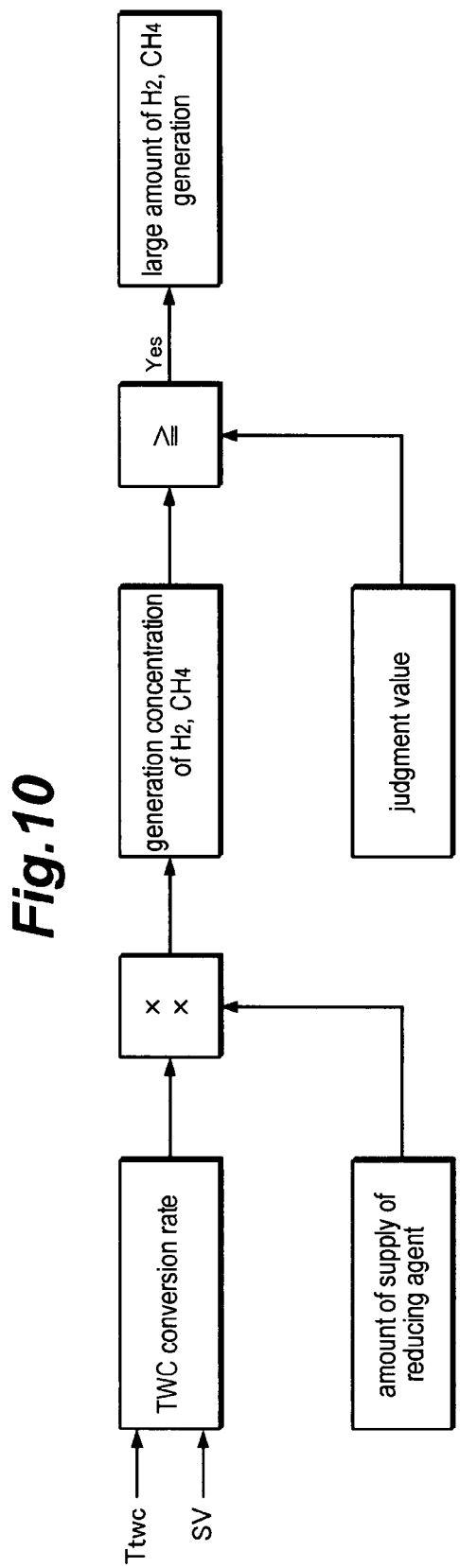
FIG. 10 is a control block showing a process for determining an amount of generation of H$_2$ and/or CH$_4$ by taking into account the conversion ratio of TWC.

Further, as shown in FIG. 9, depending on the conversion rate of TWC 13, the amount of generation of $H_2$ and/or $CH_4$ becomes relatively larger in the region where the temperature Ttwc is relatively low (less than 300° C., for example) and the space velocity SV is at a middle level. This is because the low activity of the TWC 13 causes the reaction of HC to generate a large amount of $H_2$ and/or $CH_4$. It will be appreciated from FIG. 9 that in the region where the activity of TWC 13 is low, if the space velocity SV is high, the reaction of HC does not reach a state where $H_2$ and/or $CH_4$ are generated while if the space velocity SV is low, the reaction proceeds further to convert $H_2$ and $CH_4$ into harmless form, and thus, in both cases, the amount of generation of $H_2$ and/or $CH_4$ is relatively small.

In this embodiment, in the judgment based on the conversion rate, the conversion rate of TWC 13 determined from the TWC temperature Ttwc and the space velocity SV is multiplied with the amount of supply of reducing agent to calculate the generation concentration of $H_2$ and/or $CH_4$, and if this exceeds a predetermined judgment value, it is determined that a large amount of $H_2$ and/or $CH_4$ is generated. It should be mentioned that the amount of supply of reducing agent can be obtained by subtracting the output of the F_LAF sensor from the near-stoic A/F, and multiplying the subtraction result with the amount of intake air.

If H2 and/or CH4 is not generated in a large amount and hence the judgment in step S23 is "YES", then a judgment is made on whether or not the output from the M_LAF sensor 16 has reached a prescribed value (step S24), and if the judgment result is "NO", the correction of reduction termination threshold value is not performed.

If the output from the M_LAF sensor 16 has reached the prescribed value and hence the judgment result in step S24 is "YES", then an accumulation value MCO of the amount of reducing agent supplied to the lean NOx catalyst (LNC 15) is divided by an accumulation value FCO of the amount of reducing agent supplied to the TWC 13 at different times to obtain a plurality number of MCO/FCO, and then obtain an average value of the plurality number of MCO/FCO (step S25). Specifically, the average MCO/FCO can be obtained by first obtaining a plurality of samples of MCO/FCO by dividing MCO estimated at different times by FCO at corresponding times, and then averaging the plurality of sampled MCO/FCO by means of least squares, for example. As this MCO, the accumulated amount of reducing agent obtained in the above described step S13 may be used. The FCO can be obtained by performing accumulation of amount of reducing agent at the same time with obtaining the MCO. The FCO can be obtained from the map shown in FIG. 4 by retrieving an amount of reducing agent corresponding to an exhaust accumulation value obtained by the following Equation (2):

$$\text{exhaust accumulation value} = \Sigma\{SV \times (\text{near-stoic } A/F - F\_LAF \text{ output})\} \quad (2)$$

In Equation (2), SV indicates the space velocity of the exhaust gas in the TWC 13, and near-stoic A/F indicates an A/F in the vicinity of stoichiometric A/F (14.5, for example), and F_LAF output indicates the output from the F_LAF sensor 14.

Subsequently, a judgment is made on whether or not the number of samples of MCO/FCO has exceeded a prescribed number (step S26), and if not, the correction of reduction termination threshold value is not performed. In other words, if the number of samples is small, the correction for TWC deterioration is not made valid, and the initial reduction termination threshold value set by the threshold value setting block 29 is used in the rich spike termination judgment. In this way, not a single sample value but an average of a plurality of sample values (i.e., a statistically processed value) is used to detect the degree of deterioration of the TWC 13.

If the prescribed number or more of samples are obtained, the degree of deterioration is detected based on the averaged MCO/FCO calculated in step S25, and the reduction termination threshold value for use in the rich spike control termination is corrected in accordance with the detection result (step S27). The correction of reduction termination threshold value is carried out by retrieving a reduction termination threshold value corresponding to the degree of deterioration from a table (graph) as shown in FIG. 11 and replacing the reduction termination threshold value which has been set for use in the rich spike termination judgment in FIG. 3 with the one retrieved from the graph of FIG. 11, where the degree of deterioration is represented by the averaged MCO/FCO.

Figure 11:
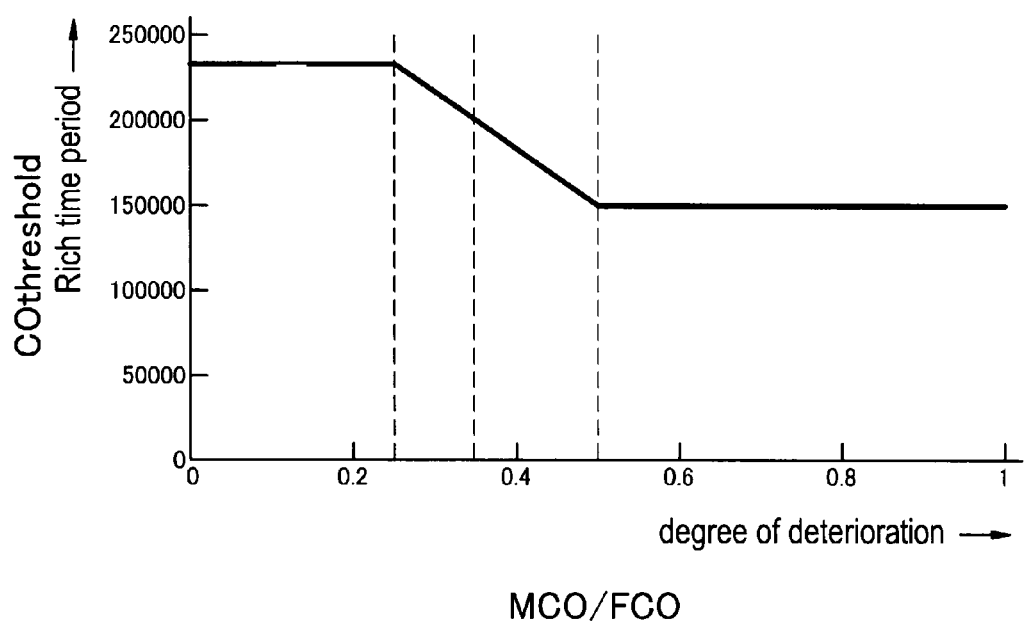
FIG. 11 is a table for obtaining a reduction termination threshold value corresponding to the degree of deterioration of TWC.

In the graph of FIG. 11, the degree of deterioration (averaged MCO/FCO) and the reduction termination threshold value are related to each other such that the reduction termination threshold value decreases as the degree of deterioration increases in a predetermined range.

By using such a table to obtain a reduction termination threshold value corresponding to the degree of deterioration and correcting the reduction termination threshold value used in the rich spike termination judgment in step S14 of FIG. 3, it is possible to supply an appropriate amount of reducing agent to the LNC 15. Specifically, as the degree of deterioration of TWC 13 increases, the amount of reducing agent consumed at the TWC 13 decreases, and therefore, it is possible to shorten the period of time of the rich operation.

As described above, by averaging the response delay of the M_LAF sensor 16 relative to the F_LAF sensor 14, the degree of deterioration of the TWC 13 can be precisely estimated without being affected by the change of the amount of oxygen adsorption (or oxygen storage capacity) for different rich spike controls. As a result, it is possible to supply the reducing agent steadily and lower the amount of HC, CO, NOx, etc. discharged to the atmosphere.

Although the present invention has been described above in terms of preferred embodiments thereof, it is obvious to a person skilled in the art that various alterations and modifications are possible without departing from the scope of the present invention which is set forth in the appended claims. For example, the reducing agent can be supplied by means other than those described above. Such other means may include injecting the fuel in the expansion or discharge strokes or supplying the reducing agent into the exhaust system.

The disclosure of the original Japanese patent application (Japanese Patent Application No. 2006-317420 filed on Nov. 24, 2006) on which the Paris Convention priority claim is made for the present application is hereby incorporated by reference in its entirety.

The invention claimed is:

1. An exhaust gas purifying device for an internal combustion engine, comprising:
   an exhaust purifying catalyst provided in an exhaust passage of an internal combustion engine for purifying an exhaust gas;
   a NOx purifying catalyst disposed downstream of the exhaust purifying catalyst for trapping NOx in the exhaust gas in an oxidizing atmosphere and reducing/purifying the trapped NOx in a reducing atmosphere;
   an upstream air fuel ratio detecting sensor disposed on an upstream side of the exhaust purifying catalyst to detect an air fuel ratio of the exhaust gas flowing into the exhaust purifying catalyst;
   a downstream air fuel ratio detecting sensor disposed between the exhaust purifying catalyst and the NOx purifying catalyst to detect an air fuel ratio of the exhaust gas flowing out of the exhaust purifying catalyst;
   a first reducing agent calculating means for computing a first amount of a reducing agent in the exhaust gas supplied to the exhaust purifying catalyst from the detected upstream air fuel ratio;
   a second reducing agent calculating means for computing a second amount of a reducing agent in the exhaust gas supplied to the NOx purifying catalyst from the detected downstream air fuel ratio;
   a reduction control terminating means for terminating a reduction control when the amount of a reducing agent supplied to the NOx purifying catalyst exceeds a prescribed reduction termination threshold value;
   a deterioration degree detecting means for detecting a degree of deterioration of the exhaust purifying catalyst from a ratio of the second amount of the reducing agent to the first amount of the reducing agent;

a threshold value correcting means for correcting the reduction termination threshold value according to the degree of deterioration of the exhaust purifying catalyst detected by the deterioration degree detecting means; and a correction prohibiting means for prohibiting the correction of the reduction termination threshold value by the threshold value correcting means when it is estimated that an amount of $H_2$ and/or $CH_4$ in the exhaust gas supplied to the exhaust purifying catalyst and/or the exhaust gas supplied to the NOx purifying catalyst exceeds a prescribed correction prohibiting judgment value from a prescribed operating condition of the engine.

2. The exhaust gas purifying device for an internal combustion engine according to claim 1, wherein the prescribed operating condition comprises a prescribed region defined in an engine rotational speed and output torque map.

3. The exhaust gas purifying device for an internal combustion engine according to claim 1, wherein the prescribed operating condition comprises a prescribed region defined in an exhaust purifying catalyst temperature and space velocity map.

4. The exhaust gas purifying device for an internal combustion engine according to claim 1, wherein the prescribed operating condition comprises a low temperature combustion region of the engine.

5. A method for purifying an exhaust gas of an internal combustion engine comprising an exhaust purifying catalyst provided in an exhaust passage of the internal combustion engine for purifying an exhaust gas and a NOx purifying catalyst disposed downstream of the exhaust purifying catalyst for trapping NOx in the exhaust gas in an oxidizing atmosphere and reducing/purifying the trapped NOx in a reducing atmosphere, wherein the method comprises the steps of:

detecting an air fuel ratio of the exhaust gas flowing into the exhaust purifying catalyst;

detecting an air fuel ratio of the exhaust gas flowing into the NOx purifying catalyst;

computing a first amount of a reducing agent in the exhaust gas supplied to the exhaust purifying catalyst from the detected upstream air fuel ratio;

computing a second amount of a reducing agent in the exhaust gas supplied to the NOx purifying catalyst from the detected downstream air fuel ratio;

terminating a reduction control when the second amount of the reducing agent supplied to the NOx purifying catalyst exceeds a prescribed reduction termination threshold value; and correcting the reduction termination threshold value according to the degree of deterioration of the exhaust purifying catalyst, wherein the step of correcting the reduction termination threshold value is prohibited when it is estimated that an amount of $H_2$ and/or $CH_4$ in the exhaust gas flowing into the exhaust purifying catalyst and/or into the NOx purifying catalyst exceeds a prescribed correction prohibiting judgment value from a prescribed operating condition of the engine.

6. The method according to claim 5, wherein the prescribed operating condition comprises a prescribed region defined in an engine rotational speed and output torque map.

7. The method according to claim 5, wherein the prescribed operating condition comprises a prescribed region defined in an exhaust purifying catalyst temperature and space velocity map.

8. The method according to claim 5, wherein the prescribed operating condition comprises a low temperature combustion region of the engine.

9. A computer-readable medium having computer-executable instructions for performing a method for purifying an exhaust gas of an internal combustion engine comprising an exhaust purifying catalyst provided in an exhaust passage of the internal combustion engine for purifying an exhaust gas and a NOx purifying catalyst disposed downstream of the exhaust purifying catalyst for trapping NOx in the exhaust gas in an oxidizing atmosphere and reducing/purifying the trapped NOx in a reducing atmosphere, wherein the method comprises the steps of:

detecting an air fuel ratio of the exhaust gas flowing into the exhaust purifying catalyst;

detecting an air fuel ratio of the exhaust gas flowing into the NOx purifying catalyst;

computing a first amount of a reducing agent in the exhaust gas supplied to the exhaust purifying catalyst from the detected upstream air fuel ratio;

computing a second amount of a reducing agent in the exhaust gas supplied to the NOx purifying catalyst from the detected downstream fuel ratio;

terminating a reduction control when the second amount of the reducing agent supplied to the NOx purifying catalyst exceeds a prescribed reduction termination threshold value; and correcting the reduction termination threshold value according to the degree of deterioration of the exhaust purifying catalyst, wherein the step of correcting the reduction termination threshold value is prohibited when it is estimated that an amount of $H_2$ and/or $CH_4$ in the exhaust gas flowing into the exhaust purifying catalyst and/or into the NOx purifying catalyst exceeds a prescribed correction prohibiting judgment value from a prescribed operating condition of the engine.

10. The computer-readable medium according to claim 9, wherein the prescribed operating condition comprises a prescribed region defined in an engine rotational speed and output torque map.

11. The computer-readable medium according to claim 9, wherein the prescribed operating condition comprises a prescribed region defined in an exhaust purifying catalyst temperature and space velocity map.

12. The computer-readable medium according to claim 9, wherein the prescribed operating condition comprises a low temperature combustion region of the engine.

* * * * *